No. 655,375. Patented Aug. 7, 1900.
T. SCANLON.
ORCHARD PLOW.
(Application filed Apr. 25, 1900.)
(No Model.) 2 Sheets—Sheet 1.
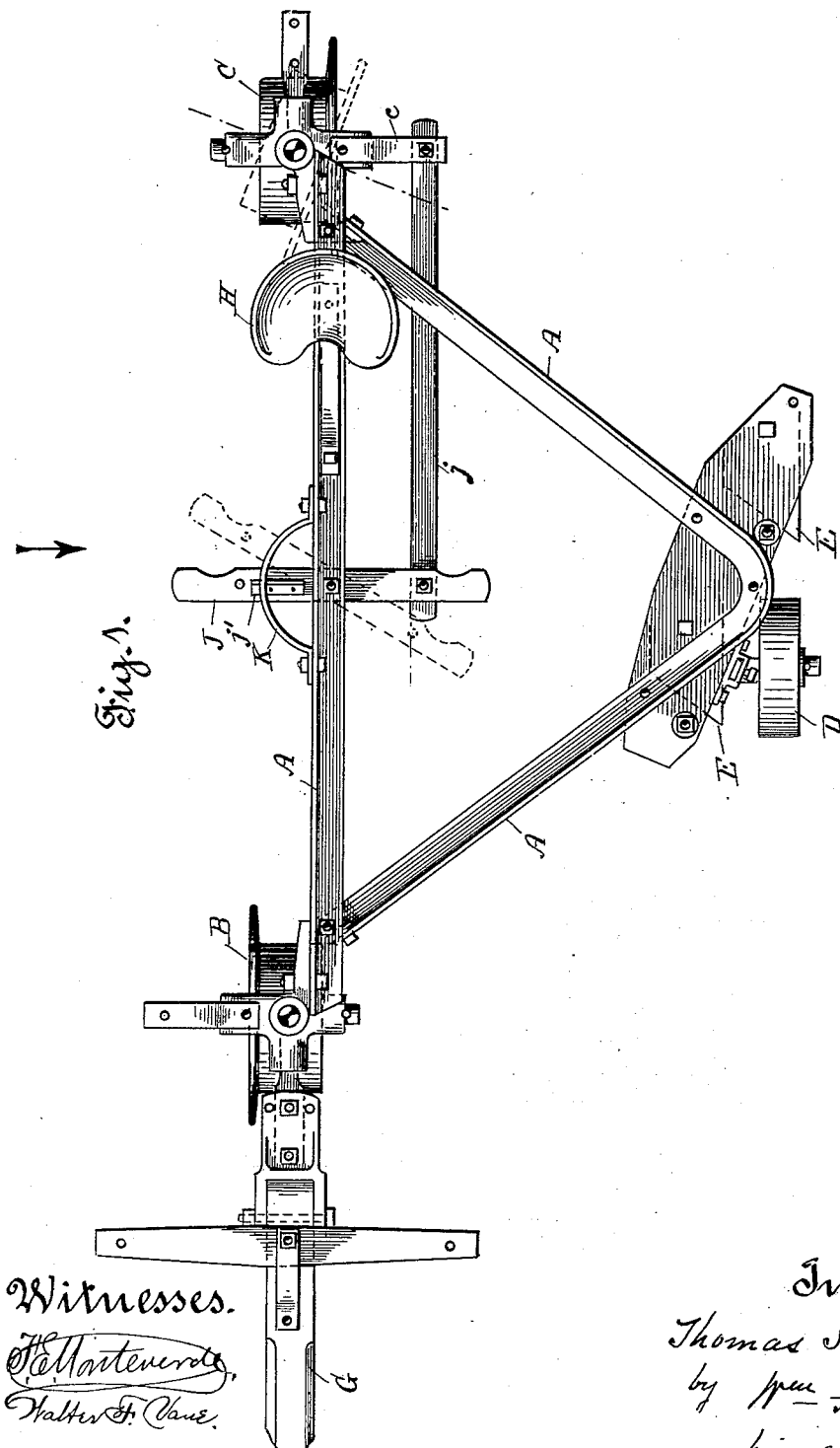
Witnesses.
Inventor.
Thomas Scanlon,
by Wm. F. Booth,
his attorney.

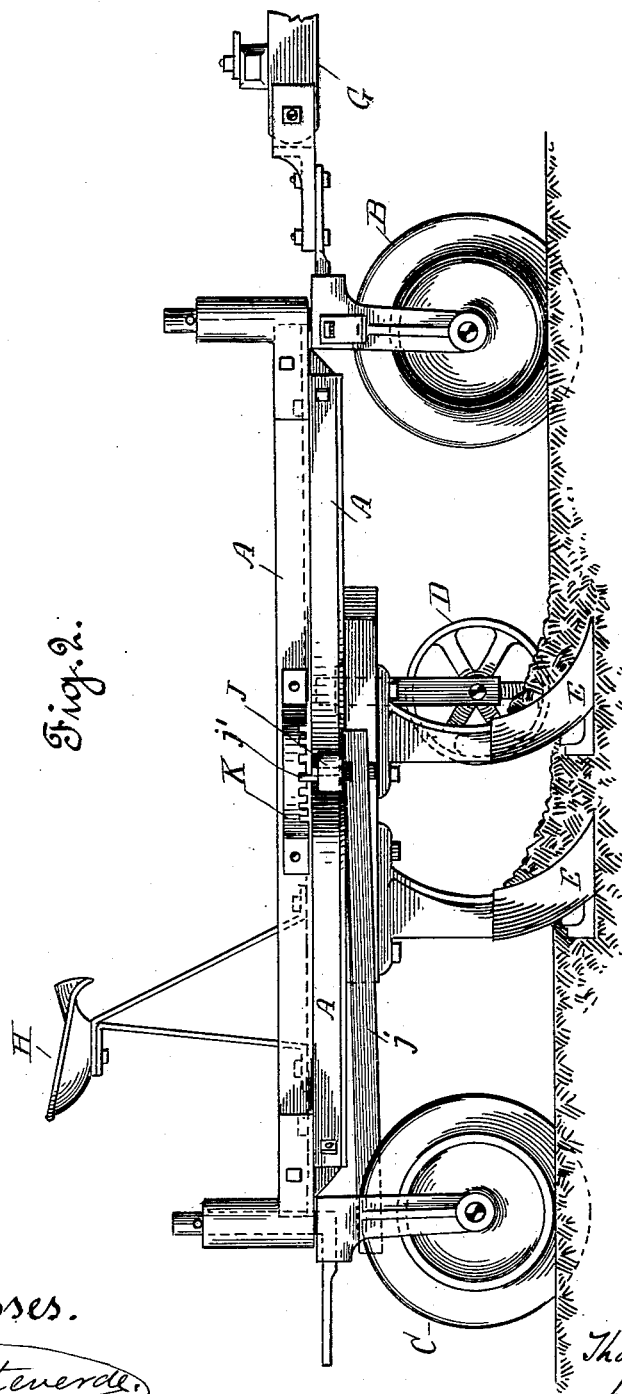

United States Patent Office.

THOMAS SCANLON, OF FRESNO COUNTY, CALIFORNIA, ASSIGNOR TO JAMES PORTEOUS, OF SAME PLACE.

ORCHARD-PLOW.

SPECIFICATION forming part of Letters Patent No. 655,375, dated August 7, 1900.

Application filed April 25, 1900. Serial No. 14,262. (No model.)

*To all whom it may concern:*

Be it known that I, THOMAS SCANLON, a citizen of the United States, residing in the county of Fresno and State of California, have invented certain new and useful Improvements in Orchard-Plows; and I do hereby declare the following to be a full, clear, and exact description of the same.

My invention relates to an orchard-plow like that shown in the patent to James Porteous, No. 613,305, dated November 1, 1898. This plow has a triangular frame supported upon three wheels, one at or near each angle. One of said wheels—namely, that located at the apex—is the gage-wheel to regulate the working depth of the plow-bottoms, and the other wheels are swivel-wheels to hold the plow-frame in the line of draft. The plow-bottoms or other cultivator-teeth are carried by the frame at its apex, while the team is hitched to the extremity of the base-line of the triangular frame, and the line of draft is in said base-line. Such being the disposition of resistance and draft, (which disposition is the result of having to throw the plows over as far as possible to one side of the line of draft to enable them to work up close to the trees, while the team may travel free of the branches,) it is necessary in this plow to so control the swivel-wheels at the extremities of the base as to keep the line of draft in said base-line, so that the plows may be held up to their work, and the implement follows straight in the line of travel of the team. This control is effected by having the tongue or pole connected with the front swivel-wheel, so that the team regulates its movements, and by having said front wheel connected with the rear swivel-wheel in such manner that the two work in unison, the front wheel being turned by the team to such an angle as to keep the front end of the frame from swinging inwardly toward the line of trees, while the rear wheel is simultaneously and automatically turned to such an angle as to keep the rear end of the frame from swinging outwardly or away from the line of trees. This operation is fully described in the patent mentioned, and it is sufficient herein to state, briefly, that the purpose and effect of the simultaneous and automatic control of the connected swivel-wheels are to hold the plows up to their work by keeping the line of draft in the base-line of the frame and to cause the implement to follow straight in the line of travel. A disadvantage of having the implement thus follow straight in the line of travel is that on account of the difficulty of getting the team to travel up close to tree branches there are many places where the plows cannot reach, and also even in cases where the plows can be made to reach over far enough—as, for example, very close to or in a line between the trunks of the trees—the only way in which the trunks can be avoided is by directing the team in and out, which is practically impossible.

The object of my invention is to provide for diverting the course of the implement to and from the line of travel of the team, so that the plows may be directed independently of the team into otherwise inaccessible places and may be made to readily avoid and pass around the tree-trunks. This I do by disconnecting the rear swivel from the front one, and while still having the latter under the control of the team I place the rear swivel-wheel under the direct and independent control of the driver, so that he may change its angles to suit the circumstances.

My invention consists in the means and combinations which I shall now describe and claim.

Referring to the accompanying drawings, Figure 1 is a plan of my plow. Fig. 2 is a side view looking at the plow in the direction of the arrow of Fig. 1.

A is the frame of the plow, made in a triangular shape. It is supported at its angles by the wheels B, C, and D, of which B and C are at the extremities of the base of the frame and D is at the apex thereof. Each of the wheels B and C is a swiveled wheel, while the wheel D is the gage-wheel. The plow-bottoms E or other suitable teeth are carried under the apex of the frame in suitable manner.

G is the pole or tongue. It is connected with and is adapted to control the front swivel-wheel B.

H is the seat for the driver.

There may be different means by which the driver is enabled to independently control the rear wheel. The connections I deem best, and which I here show as one form of such means, are as follows:

Under the bar which forms the base of the triangular frame is pivoted a cross-lever J in such a position that the driver when occupying his seat can place his feet thereon and control it. A link $j$ connects one end of the lever with the crank-arm $c$ of the swivel-stem of the rear wheel C.

K is a rack secured to the frame A and passing over the cross-lever J, and with this rack a lug or tooth $j'$ on said cross-lever is adapted to engage. The cross-lever is so pivoted to the frame as to permit it to have sufficient rocking play to enable its lug or tooth to rise to and to fall from engagement with the rack, as said lever is controlled by the feet of the driver.

The operation is as follows: Ordinarily when the implement is following straight in the line of travel with the line of draft in the base-line of the frame the driver, having set the rear wheel at the proper angle and fixed it there by the engagement of the cross-lever with its holding-rack, simply rests his feet upon said lever; but when it is necessary to divert the course of the plow from the line of travel of the team in order to avoid and swing out from a tree-trunk the driver by pressing down with one foot upon one end of the cross-lever releases it from its rack and then, letting said lever swing free, the natural tendency, due to the shape of the frame and the position of the team with respect thereto, will cause the rear end of the frame to swing out to one side, and thus carry the plow-bottoms away from the tree, this result being due to the non-guidance or non-resistance of the now free rear wheel. To throw the plow back again, the driver simply returns the cross-lever and by fixing it in its rack once more sets the rear wheel at the proper angle, and thereupon the plows are held up to their work, and the implement follows in the line of travel. As the plow is intended to be reversible end for end, as is described in the Porteous patent above mentioned, it will be readily understood that when such reversal takes place the link $j$ of the cross-lever will be shifted to its other end and connected with the then rear wheel.

Having thus described my invention, what I claim as new, and desire to secure by Letters Patent, is—

1. The combination, in an orchard-plow, of a triangular frame, having its plow-bottoms, or other cultivator-teeth, at its apex, a swivel-wheel, at each extremity of the base of the frame, a connection between the tongue or pole and the forward swivel-wheel, whereby said wheel is under control of the team, a lever within reach of the driver, and a link connecting said lever with the pivotal stem of the rear swivel-wheel, whereby said wheel may be independently operated.

2. The combination, in an orchard-plow, of a triangular frame, having its plow-bottoms, or other cultivator-teeth, at its apex, a swivel-wheel, at each extremity of the base of the frame, a connection between the tongue or pole and the forward swivel-wheel, whereby said wheel is under control of the team, a cross-lever pivoted to the frame of the implement, in position to be operated by the feet of the driver, and a link connecting said lever with the pivotal stem of the rear swivel-wheel, whereby said wheel may be independently operated.

3. The combination, in an orchard-plow, of a triangular frame, having its plow-bottoms, or other cultivator-teeth, at its apex, a swivel-wheel, at each extremity of the base of the frame, a connection between the tongue or pole and the forward swivel-wheel, whereby said wheel is under control of the team, a cross-lever pivoted to the frame of the implement, in position to be operated by the feet of the driver, a rack with which said lever engages, and a link connecting said lever with the pivotal stem of the rear swivel-wheel, whereby said wheel may be independently operated.

In witness whereof I have hereunto set my hand.

THOMAS SCANLON.

Witnesses:
DANIEL WEBBER,
W. T. PORTER.